T. ELTONHEAD.
Spectacles.
No. 2,034.
Patented April 2, 1841.
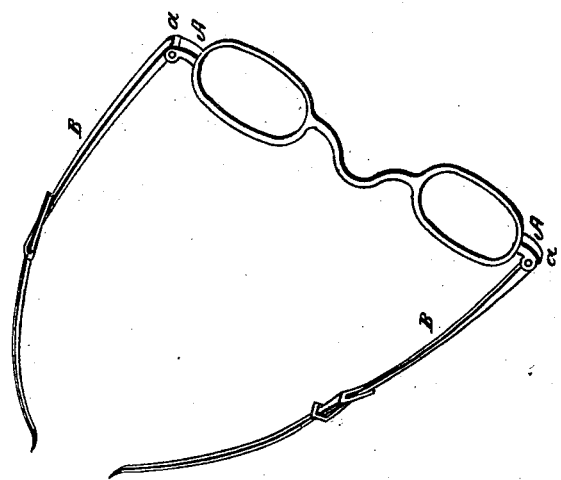

UNITED STATES PATENT OFFICE.

THOMAS ELTONHEAD, OF BALTIMORE, MARYLAND.

MODE OF FORMING THE JOINT ON THE END PIECES OF THE FRAMES OF SPECTACLES.

Specification of Letters Patent No. 2,034, dated April 2, 1841.

*To all whom it may concern:*

Be it known that I, THOMAS ELTONHEAD, of the city of Baltimore, in the State of Maryland, have invented an improvement in the manner of forming the joints on the end pieces of the frames of spectacles, whether made of gold, silver, or other metal; and I do hereby declare that the following is a full and exact description thereof.

It has heretofore been the practice in forming the frames of spectacles of metal to divide the end pieces which are soldered to the rims containing the glasses in two parts, and to connect these two parts together by means of a screw. The joint pin has been affixed to one of these parts, and the side, or temple pieces have had the tubes through which the joint pin passed, soldered to them. In my improved construction I make the end pieces solid, instead of dividing them into two parts, and into this solid piece I file a notch to receive the end of the temple piece, which is to be adapted thereto, and a hole drilled through for receiving the joint pin.

In putting in the glasses in spectacles of the ordinary construction the screw which confines the divided end pieces is removed, and the rim to receive the glass is sprung open; but in my improved frames the glasses are to be snapped into a suitable bezzle prepared for the purpose, in the manner of watch glasses.

In the accompanying drawing A, A, are the solid end pieces, and B, B, the side, or temple pieces; these are made flat where they enter the notches in the pieces A, A, and have the advantage of being left perfectly hard from the hammer, which cannot be the case when a tube is soldered on to them to constitute a part of the knuckle, or hinge joint. An offset, or projection is left on B, B, to form a stop against *a, a*.

By this improvement in the manner of making spectacle frames they are not only rendered more solid and permanent than in the ordinary mode, but they can be afforded at a diminished price as the labor in manufacturing is much decreased.

What I claim as of my invention in the within described spectacle frames is—

The manner of constructing the joint by which the pieces A, A, are connected with the side, or temple pieces B, B, the pieces A, A, being left solid, or undivided, as set forth, and the holes for the joint pins on the pieces B, B, being also drilled out of the solid metal.

THOMAS ELTONHEAD.

Witnesses:
THOS. P. JONES,
GEORGE WEST.